United States Patent Office 3,100,219
Patented Aug. 6, 1963

3,100,219
ORGANO ALUMINUM COMPOUNDS CONTAINING CYCLOALKYL GROUPS OF THE NEOPENTYL TYPE AND PRODUCTION THEREOF
Roland Köster and Wolfgang Larbig, Mulheim (Ruhr), Germany, assignors to Studiengesellschaft Kohle m.b.H., Mulheim (Ruhr), Germany, a corporation
No Drawing. Filed Aug. 3, 1961, Ser. No. 128,957
Claims priority, application Germany Aug. 18, 1960
12 Claims. (Cl. 260—448)

This invention relates to a process for the production of aluminum-organic compounds containing cycloalkyl groups of the neopentyl type.

It has been found that aluminum alkyl compounds having cycloalkyl groups of the neopentyl type can be produced in a very simple manner from 2,5-alkyl-substituted hexadienes, especially 2,5-dimethyl-hexadiene-(1,5) of the formula

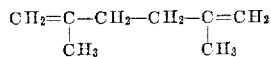

by reacting the latter in an inert atmosphere with aluminum hydride or materials which readily give aluminum hydride in the presence of heat, especially aluminum triisobutyl, the reaction taking place being as follows:

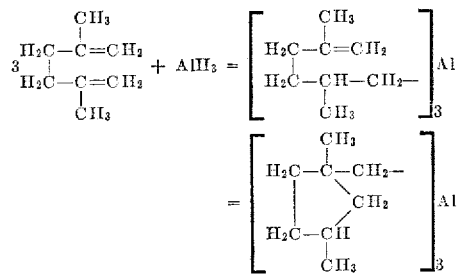

In this compound, the aluminum is bonded to —CH₂ groups which in turn are positioned at quaternary carbon atoms which are members of five-membered rings. Highly branched alkyl groups of this kind are of the neopentyl type, (CH₃)₃C—CH₂—, the simplest (non-cyclic) radical of this kind. The reaction is brought about by the fact that a group

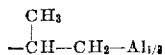

first formed adds itself to the unsaturated group

within the larger atomic grouping

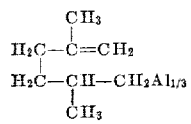

Thus, the process formally corresponds to the formation of aluminum tri-neopentyl from isobutylene and aluminum trimethyl

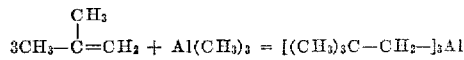

However, this process is extremely surprising because it already occurs under comparatively very mild conditions under which the addition of an aluminum trialkyl to an olefin of the type R₂C=CH₂ could never be observed up to the present. The synthesis described above of aluminum tri-neopentyl requires heating of the components to about 200° C. for an extended period of time, and similar additions of other aluminum trialkyls are not achieved at all.

It is an object of the present invention to provide a process for the production of aluminum-organo compounds having cycloalkyl groups of the neopentyl type, which process comprises treating 2,5-alkyl-substituted hexadienes with aluminum hydride or compounds giving off aluminum hydride in the presence of heat, said treatment being effected in an inert atmosphere and preferably while heating.

Aluminum alkyl compounds having alkyl radicals of the neopentyl type which are members of a ring have become producible for the first time by the invention. Due to their particular structure, the compounds exhibit novel and unexpected properties. They are thermally very stable and can, therefore, be used as organometallic catalysts even at temperatures at which other aluminum trialkyls undergo decomposition. Moreover, with heavy metal compounds, they form mixed catalysts which are distinguished by particular effects.

The invention was described above with the use of aluminum hydride as an example. When reacting aluminum trialkyls or dialkyl aluminum hydrides with, for example, 2,5-dimethyl-hexadiene-(1,5), the reaction of the invention proceeds in an analogous manner except that olefin is set free as a by-product as is illustrated by the following equations in which aluminum isobutyl compounds are used as an example:

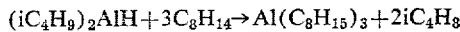
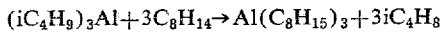

The reactions of the invention proceed particularly satisfactorily at as low as room temperature up to 250° C. and preferably at 80° to 200° C., especially between 100° and 130° C. and proceed smoothly and to completion. Lower temperatures, e.g. 50° C., are absolutely sufficient in the presence of catalysts of the so-called displacement reactions, especially nickel in finely divided form. Moreover, other aluminum alkyls such, for example, as the propyl compounds may be used in place of the isobutyl compounds. When heating the reaction mixture to higher temperatures, the result desired is obtained in a shorter time.

When changing the relative proportions fixed in the two equations, it is possible to prepare mixed aluminum trialkyls having radicals of the type mentioned. Accordingly, the invention relates not only to the production of aluminum trialkyls having three identical alkyl radicals belonging to the cyclic neopentyl type, but also to the production of aluminum alkyls which contain such radicals anyway even if they are present in addition to one or two different alkyl radicals.

The invention is illustrated in the following examples, in all of which the process was operated under an inert atmosphere.

*Example 1*

A total of 375 gms. (3.4 moles) of 2,5-dimethyl-hexadiene-(1,5) was added dropwise within about 6 hours to 158 gms. (1.1 moles) of aluminum diisobutyl hydride at 120° to 130° C. The temperature in the mixture is maintained by the reaction heat evolved with isobutene escaping. After the addition of the olefin, heating is continued for 1 to 2 hours to 130° to 140° C. thereby obtaining a total of 120 gms. of isobutene. Thereafter, excess diene (about 10 grams) is removed under a reduced pressure at room temperature. The remaining new aluminum trialkyl (360 gms.) (aluminum content, 7.45%) is a colorless liquid having a boiling point of 109 to 11° C. at 10⁻⁵ mm. Hg. Molecular weight of the compound=360; found, 358, 362. Hydrolysis gives quantitatively 1-dimethyl-3-methyl-cyclopentane. When heating to 200° C. rather than to 130–140° C. as mentioned above, the result desired is obtained after as little as 15 minutes.

*Example 2*

156 gms. of aluminum tripropyl are mixed with 100 mg. of nickel acetyl acetonate suspended in 10 ml. of hexane. This results in the formation of black nickel with reduction, most of the nickel remaining in colloidal solution in the aluminum propyl. When now mxing with 375 gms. of 2,5-dimethyl hexadiene-(1,5) and heating gently, evolution of propylene begins at a temperature of as low as 50° C. Heating to a final temperature of 100 to 120° C. is continued until a total of 60 to 70 liters of propylene gas has escaped and the evolution of gas ceases Distillation under a high vacuum results in the same product as that obtained in Example 1.

*Example 3*

A suspension of 10 gms. (0.3 mole) of aluminum hydride in 300 ml. of pentane is allowed to drop slowly within about 1 hour into 110 gms. (1 mole) of 2,5-dimethyl-hexadiene-(1,5). The reaction takes place immediately (the AlH₃ passes into solution) and part of the pentane distils. The colorless solution is subsequently heated at 130° C. for about 1 hour thereby completely distilling off the solvent. 115 gms. (95% of the theory) of the compound of Example 1 distil under a largely reduced pressure (10⁻⁵ mm. Hg./109 to 111° C.).

*Example 4*

220 gms. (2.0 moles) of 2,5-dimethyl-hexadiene-(1,5) are added dropwise within 7 hours at 160° C. to 170 gms. (0.6 mole) of aluminum-tri-n-hexyl. A total of 148 gms. of n-hexene-(1) is obtained, the balance of the olefin being recovered with the excess diene (21 gms.) by distillation under reduced pressure (about 10⁻² mm. Hg). The aluminum trialkyl obtained by the subsequent distillation (201 gms.=93% of the theory; B.P. 109–111° C. at 10⁻⁵ mm. Hg) corresponds to the compound described in Example 1.

*Example 5*

142 gms. (1.0 mole) of aluminum-di-n-butyl hydride are mixed with a suspension of 110 mg. of cobalt acetyl acetonate in 15 ml. of hexane. The dark brown cobalt formed by reduction remains in colloidal solution in the aluminum-di-n-butyl hydride. At 60° C., 400 gms. (3.22 moles) of 2-methyl-5-ethyl-hexadiene-(1,5) are slowly added while butene escapes. Towards the end, the temperature is raised to 140° C. until a total of 42 liters of butene are driven off. The reaction product which is distillable at 125° to 128° C./10⁻⁵ mm. Hg as a colorless liquid gives a mixture of 1-dimethyl-3-ethyl-cyclopentane and 1-ethyl-1,3-dimethyl-cyclopentane when hydrolyzed. The molecular weight (calculated, 402) was found to be 399 and 404 (freezing point depression in cyclohexane). The aluminum content (calculated, 6.7%) was determined to be 6.8% and 7%. The yield of aluminum trialkyl of the neopentyl type is 376 gms. corresponding to 94% of the theoretical.

*Example 6*

277 gms. (2.0 moles) of 2,5-diethylhexadiene-(1,5) are added dropwise within about 5 hours at 150° C. to 170 gms. (0.6 mole) of aluminum triisohexyl. There are obtained 149 gms. of 2-methylpentene-(1) which are distilled off together with excess hexadiene (10⁻³ mm. Hg at room temperature). The distillation results in a colorless liquid (137–140° C./10⁻⁵ mm. Hg), the aluminum content of which is 6.20% (calculated, 6.06%). Hydrolysis of the aluminum alkyl gives 1-methyl-1,3-diethyl-cyclopentane. The yield is 253 gms. (95% of the theoretical).

The molecular weight of the aluminum compound was found to be 442 (calculated, 444).

We claim:

1. Aluminum alkyl compounds of high thermal stability having alkyl radicals of the neopentyl type of the formula

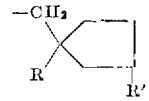

wherein R represents a member selected from the group consisting of methyl and ethyl and R' represents a member selected from the group consisting of hydrogen, methyl and ethyl.

2. Aluminum alkyl compounds of high thermal stability having alkyl radicals of the neopentyl type of the formula

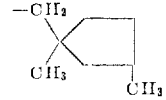

having a boiling point of 109°–111° C. at 10⁻⁵ mm. Hg and a molecular weight of 360.

3. Aluminum alkyl compounds of high thermal stability having alkyl radicals of the neopentyl type of the formula

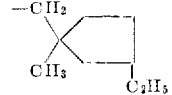

4. Aluminum alkyl compounds of high thermal stability having alkyl radicals of the neopentyl type of the formula

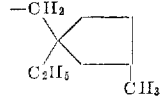

5. Aluminum alkyl compounds of high thermal stability having alkyl radicals of the neopentyl type of the formula

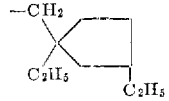

having a boiling point of 137–140° C. at 10⁻⁵ mm. Hg and a molecular weight of 442.

6. Process for preparing an aluminum-organo compound having alkyl radicals of the neopentyl type of the formula

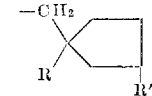

wherein R represents a member selected from the group consisting of methyl and ethyl and R' represents a member selected from the group consisting of hydrogen, methyl and ethyl which comprises reacting a 2,5-alkyl substituted hexadiene wherein said alkyl substituents contain 1 to 2 carbon atoms with an aluminum compound selected from the group consisting of aluminum hydride, aluminum trialkyls and aluminum dialkyl hydrides at an elevated temperature and in an inert atmosphere, and recovering the aluminum-organo compound formed.

7. Process according to claim 6 wherein said 2,5-alkyl substituted hexadiene is 2,5-dimethyl-hexadiene-(1,5).

8. Process according to claim 6 wherein said aluminum-organo compound is aluminum tri-isobutyl.

9. Process according to claim 6 wherein said reaction is effected at a temperature of from about 50–200° C.

10. Process according to claim 9 wherein said reaction is effected at a temperature of from about 100–130° C.

11. Process according to claim 6 wherein said reaction is effected in the presence of a catalyst selected from the group consisting of nickel and cobalt catalysts.

12. Process according to claim 11 wherein said catalyst is finely divided nickel.

References Cited in the file of this patent

UNITED STATES PATENTS

| | | |
|---|---|---|
| 2,699,457 | Ziegler et al. | Jan. 11, 1955 |
| 2,906,763 | McKinnis | Sept. 29, 1959 |

UNITED STATES PATENT OFFICE
CERTIFICATE OF CORRECTION

Patent No. 3,100,219　　　　　　　　　　　　　　August 6, 1963

Roland Köster et al.

It is hereby certified that error appears in the above numbered patent requiring correction and that the said Letters Patent should read as corrected below.

Column 3, line 1, for "11°" read -- 111° --; line 18, after "ceases" insert a period.

Signed and sealed this 25th day of February 1964.

(SEAL)
Attest:
ERNEST W. SWIDER

Attesting Officer

EDWIN L. REYNOLDS

Acting Commissioner of Patents